United States Patent
Guan et al.

(10) Patent No.: US 6,916,568 B2
(45) Date of Patent: Jul. 12, 2005

(54) FUEL CELL MODULE WITH HEAT EXCHANGE AND ELECTRICITY EXCHANGE FUNCTIONS

(75) Inventors: Jin-Chin Guan, Taipei Hsien (TW); Ming-Tarng Yeh, Taipei Hsien (TW)

(73) Assignee: Hsu-Yang Technologies Co., Ltd., Taipei Hsien (TW)

( * ) Notice: Subject to any disclaimer, the term of this patent is extended or adjusted under 35 U.S.C. 154(b) by 386 days.

(21) Appl. No.: 10/229,159

(22) Filed: Aug. 28, 2002

(65) Prior Publication Data

US 2004/0043264 A1 Mar. 4, 2004

(51) Int. Cl.$^7$ .............................. H01M 8/02; H01M 8/04

(52) U.S. Cl. .............................. 429/26; 429/30; 429/19; 429/20; 429/24; 429/23; 429/21

(58) Field of Search .............................. 429/26, 30, 19, 429/20, 24, 23, 21

(56) References Cited

U.S. PATENT DOCUMENTS 6,703,722 B2 * 3/2004 Christensen ................. 307/71

* cited by examiner

*Primary Examiner*—Patrick Joseph Ryan
*Assistant Examiner*—Angela J. Martin
(74) *Attorney, Agent, or Firm*—Troxell Law Office, PLLC

(57) ABSTRACT

The present invention relates to a fuel cell module with heat exchange and electricity exchange functions, consisting of one heat dissipation module and one electricity exchange module. The heat dissipation module is composed of several hydrogen cans and one heat dissipation base contacted with the CPU and the electricity exchange module contains the hydrogen release pressure platen, the flow rate control valve and the Proton Exchange Membrane Systems. The flow rate control valve controls the hydrogen released from the hydrogen cans that absorbs the heat generated by the CPU rapidly for heat exchange. The released hydrogen is transmitted to the Proton Exchange Membrane Systems that converts chemical energy into electric energy and is then utilized by the computer. Such heat exchange of the CPU provides the computer with D.C. power, clears up the heat dissipation problem, and substitutes the portable power for current notebooks.

8 Claims, 4 Drawing Sheets

FUEL CELL MODULE WITH HEAT EXCHANGE AND ELECTRICITY EXCHANGE FUNCTIONS

FIELD OF THE INVENTION

The present invention is a fuel cell module, especially the one applied in the computer's CPU for heat exchange and electricity exchange.

BACKGROUND OF THE INVENTION

The CPU of computers is getting faster and faster. Relatively, the high operational performance generates enormous heat because of the accumulation of electricity and heat during operation, thus influences the performance of the CPU or, even worse, causes instability or breakdown to the CPU. Therefore, the heat dissipation of the CPU should brook no delay and should be solved carefully. To solve the heat dissipation of the CPU, normally a set of heat sink is attached on the CPU.

Moreover, current heat sinks are usually made of one piece of aluminum or copper heat sink furnished with a fan. However, because of the accumulation of the heat, the heat dissipation efficiency of the heat sink for current high-level CPUs still fails to exhaust the heat consistently for cooling during high-speed operation, thus the instability and breakdown of the CPU still exist. Obviously, the heat exchange of the heat sink to the CPU currently has been trapped in the bottleneck. A thorough resolution for the heat dissipation of high-level CPUs has become a main issue for the industry.

The tendency of small-sized notebooks condenses the inner space of the computer, restricting the space for the assemblage of the heat sink. Normally, when the working temperature of the notebook's CPU is higher than 120° C., the notebook would crash down. Due to the inability to have high-level CPUs in current notebooks equipped with a large heat sink to enhance the heat dissipation efficiency and the existing heat sink for high-level CPUs reduces the work temperature of the CPU only to 80~90° C. at most, the efficiency of the current heat sink for notebooks' CPU is quite restrained, cutting down their calculation performance. Such technical bottleneck in heat dissipation of high-level CPUs has trapped the notebook industry in a dilemma. Furthermore, the most inconvenience in using a notebook currently is the application of lithium cells or Nickel-Metal Hydride batteries that provides insufficient running time or should be charged for a long time. For this reason, a demand for improving the portable power of current notebooks does exist.

In view of this, the inventor of the present invention devoted to the research and came out the application of several hydrogen storage cans as the heat dissipation solution for the CPU, wherein the hydrogen storage alloy inside the hydrogen storage cans absorbs the heat rapidly when releasing hydrogen, dissipating the heat and cooling the CPU while the chemical energy of the released hydrogen is converted into electric energy through the Proton Exchange Membrane Systems, so as to serve the computer with D.C. power.

SUMMARY OF THE INVENTION

The objective of the present invention is to provide a fuel cell module with heat exchange and electricity exchange functions for the computer's high-level CPU that consists of the heat dissipation module combined with several hydrogen storage cans and one heat dissipation base contacted with the CPU and the electricity exchange module composed of one hydrogen release platen, one flow rate control valve and one Proton Exchange Membrane Systems. With the flow rate control valve controlling the flow rate of the released hydrogen, the hydrogen storage cans are able to absorb the high heat of the CPU and cool it down. The released hydrogen transmitted to the Proton Exchange Membrane Systems is used in the conversion from chemical energy to electric energy, which is then output to the computer's motherboard as the D.C power, thus completes the heat exchange of the CPU and powers the computer with D.C. power.

Another objective of the present invention is to provide a fuel cell module with heat exchange and electricity exchange functions wherein the heat dissipation module is composed of several replaceable hydrogen storage cans for the heat exchange of the CPU. This not only leaves out the necessity of adding a cooling fan, but also minimizes the whole heat dissipation module, eliminating the space restriction on the assemblies, making it more suitable for the small space inside the notebook for heat dissipation. What's more, the rapid heat absorption of the hydrogen storage cans enhances the heat exchange efficiency of the CPU, contributing to enormous benefits for the industry.

Another objective of the present invention is to provide a fuel cell module with heat exchange and electricity exchange functions wherein the lithium cell or the Nickel-Metal Hydride battery of current notebooks used outdoors that converts chemical energy to electric energy is replaced by hydrogen and the Proton Exchange Membrane Systems. Hidden behind the Thin Film Transistor, the space-saving Proton Exchange Membrane Systems is able to combine with current Liquid Crystal Display, bringing great benefits for the industry.

In the following, the embodiment illustrated is used to describe the detailed structural characteristics and operation action for the present invention.

DETAILED DESCRIPTION OF THE INVENTION

Figure 1:
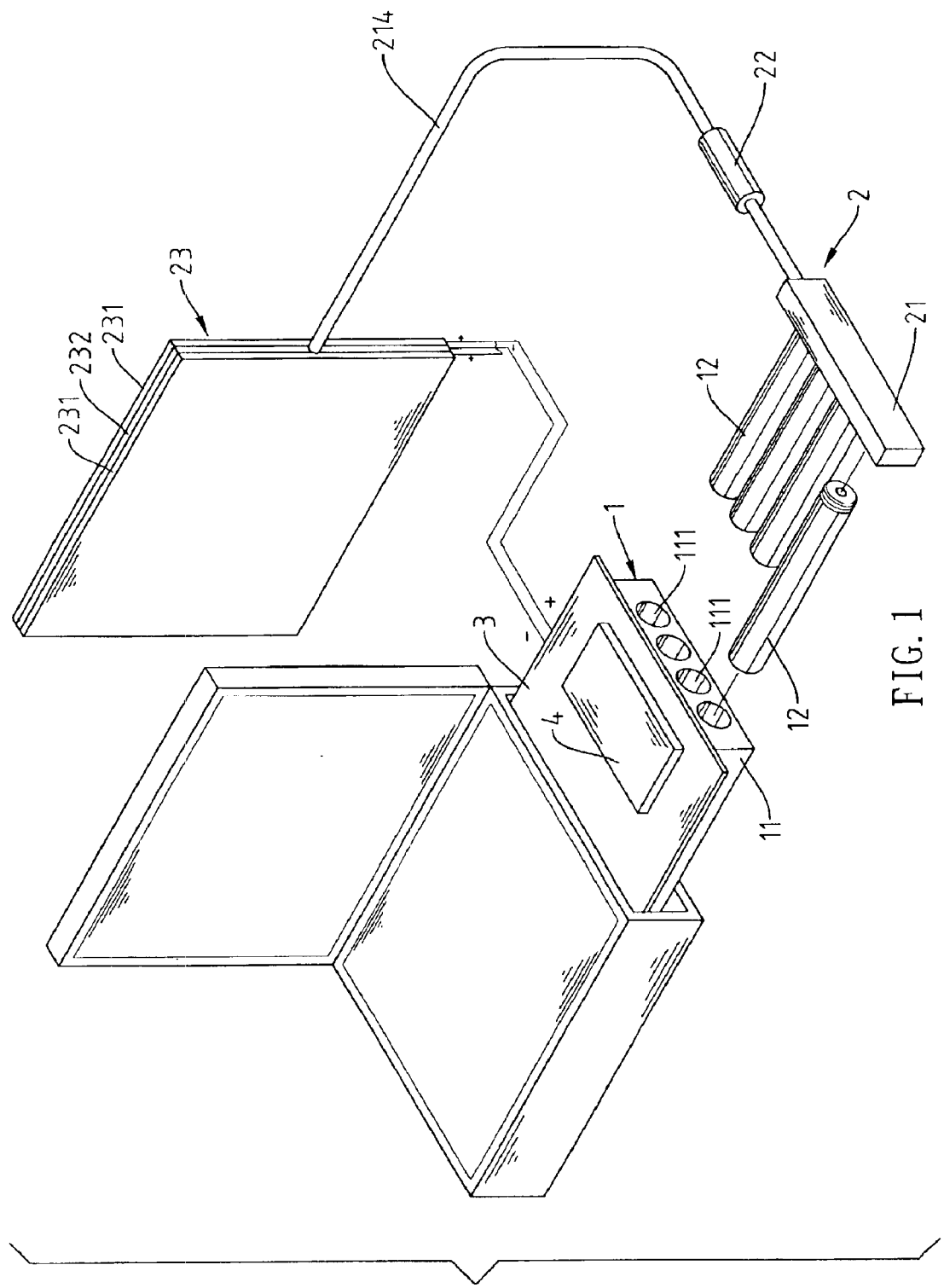
FIG. 1 is a diagram about the assembly of the components for the present invention.
Figure 2:
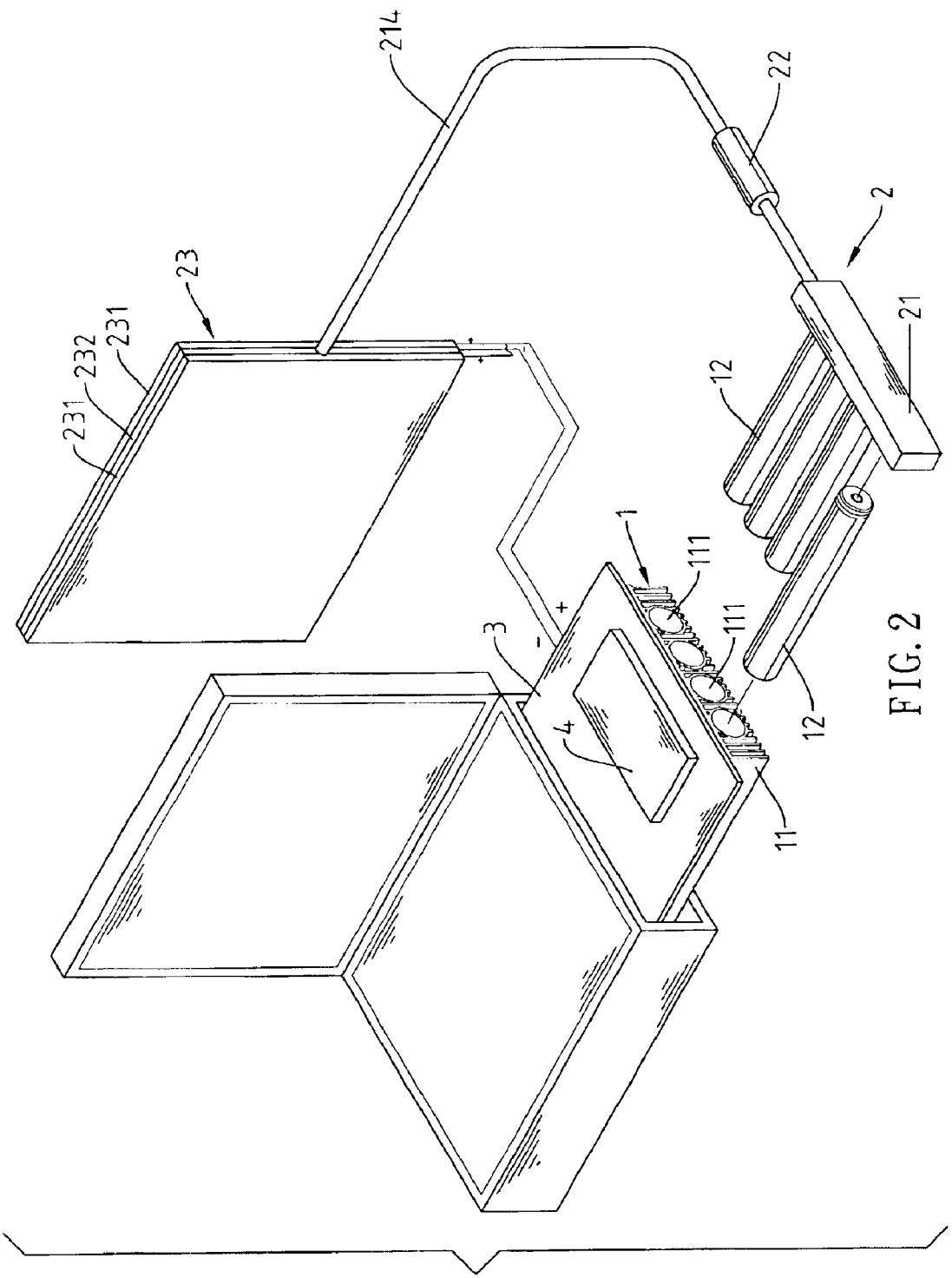
FIG. 2 is a diagram about another type of heat dissipation base for the present invention.

Please refer to FIG. 1 and FIG. 2. The fuel cell with heat exchange and electricity exchange functions for the present invention contains the heat dissipation module 1 and the electricity exchange module 2, wherein the heat dissipation module 1 includes one heat dissipation base 11 and several hydrogen storage cans 12. The heat dissipation base 11 equipped nearby the motherboard 3 is contacted with the CPU 4 for heat conduction. The heat dissipation base 11 could be a base with flat edge or fin-shaped edge with several sockets 111 at equal distance on one side for the insertion of the hydrogen storage cans 12. The hydrogen storage cans 12 are furnished with solid hydrogen storage alloy inside with a contact valve 122 on the inserting mouth in front of the hydrogen storage can 12 as the outlet for replenishing and releasing hydrogen. By touching the contact valve 122, the stored hydrogen is released as gas, making the hydrogen storage can 12 absorb the heat while releasing the hydrogen and rapidly reducing the temperature of the external can by 10° C. The sockets 111 of the heat dissipation base 11 with the hydrogen storage cans 12 slipped on form a heat dissipation module 1 to complete the heat exchange of the CPU.

Each hydrogen storage can 12 reduces the temperature by 10° C. when releasing the hydrogen. With the combination of the hydrogen storage cans 12 and the heat dissipation base 11, when the heat dissipation base 11 contacted with the whole CPU 4 arrives a high temperature of 120° C., the several hydrogen storage cans 12 in the heat dissipation base 11 provide rapid heat exchange function by absorbing the heat generated by the CPU, reducing the temperature of the whole heat dissipation base 11 immediately by 30~50° C. Compared with traditional heat sinks that reduce the temperature of the CPU by 80~90° C. through heat exchange, the heat dissipation module for the present invention doubles the heat exchange efficiency, making it the most valuable technical breakthrough.

Figure 3:
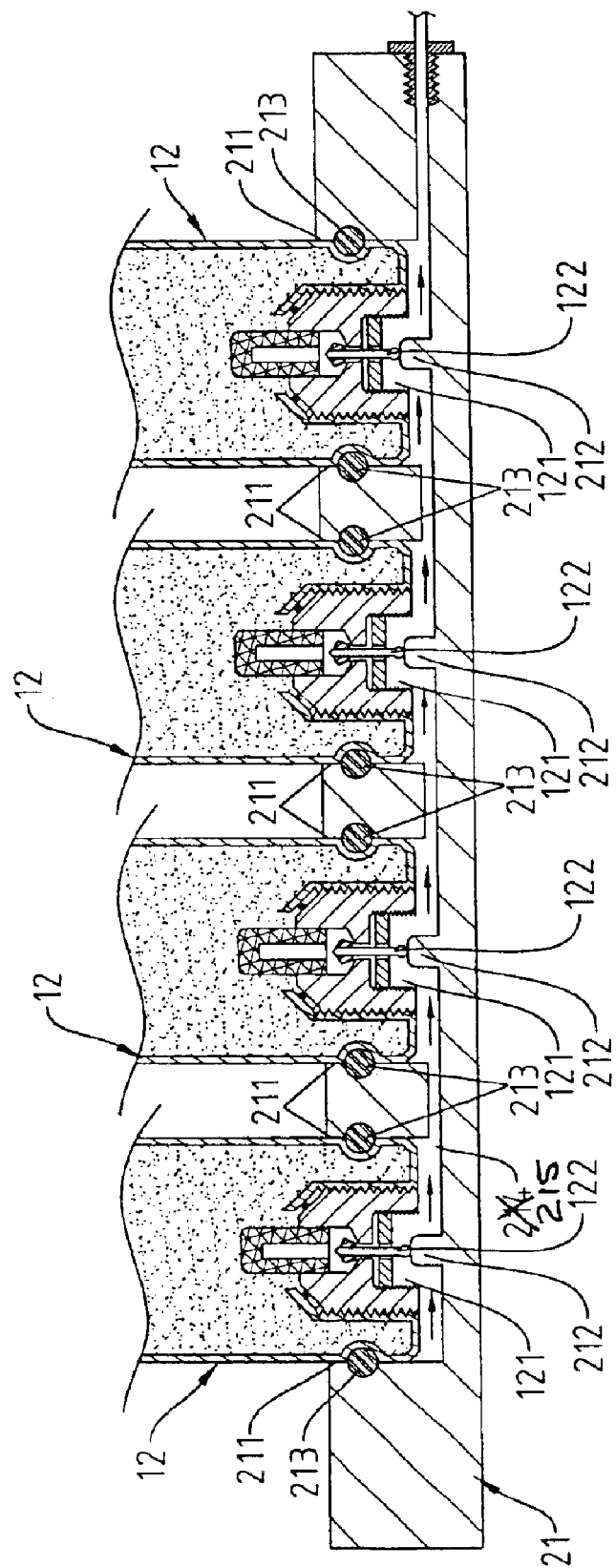
FIG. 3 is a diagram about the assembly of the hydrogen release platen and the hydrogen storage cans for the present invention.
Figure 4:
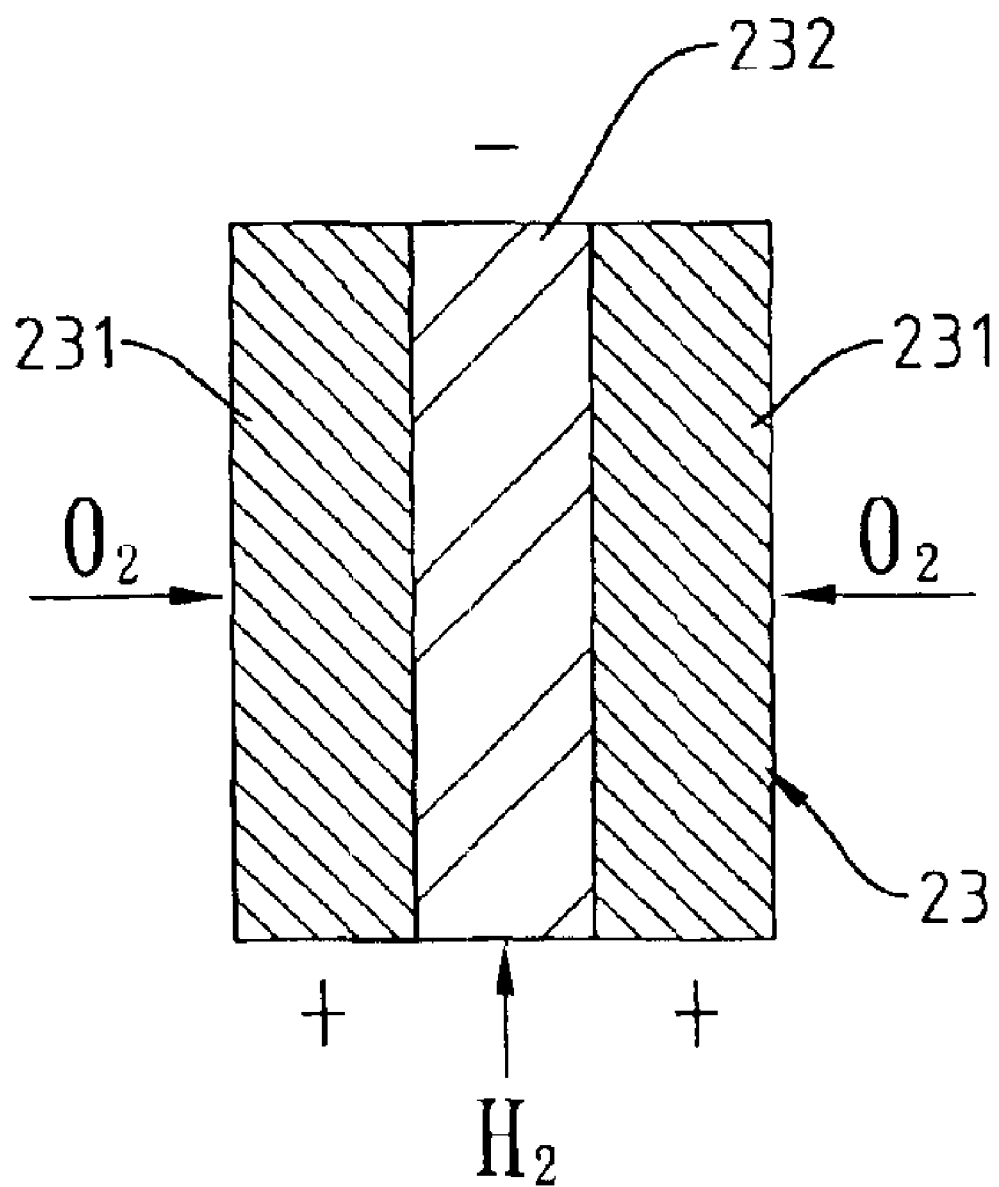
FIG. 4 is a diagram about the components of the Proton Exchange Membrane Systems converting chemical energy into electric energy for the present invention.

Furthermore, the electricity exchange module 2 contains one hydrogen release platen 21, one flow rate valve 22 and the Proton Exchange Membrane Systems 23, where in the hydrogen release platen 21 is buckled on the exterior of the heat dissipation base 11 with an equal number of inserting troughs 211 against the hydrogen storage cans 12 sitting correspondingly on the side, allowing the inserting mouth 121 of the hydrogen storage cans 12 to insert. Besides, there is a press-and-pull assembly 212 at the bottom of each inserting trough 211 of the hydrogen release platen that touches against the contact valve 122 of the hydrogen storage cans 12 in order to release the hydrogen from the hydrogen storage alloy inside the hydrogen storage cans 12. With a leakage-resistant ring 213 inset around the opening of each inserting trough 211 of the hydrogen release platen 21, the hydrogen storage cans 12 whose inserting mouth being inserted onto the inserting trough 211 are secured and the gas is prevented from leaking out (as shown in FIG. 3).

There is an airway 215 inside the hydrogen release platen 21 for the connection of each inserting trough 211. The terminal of the airway 215 is connected to a conduit 214 outside the platen that is connected with a flow rate control valve 22 at the middle for controlling the flow rate of the hydrogen released from the hydrogen storage cans 12 by means of the hydrogen release platen 21. The terminal of the conduit 214 is connected to the Proton Exchange Membrane Systems 23 that consists of two proton exchange membranes 231 on the outside as the anode interface for oxygen and electrolyte and one membrane between the two proton exchange membranes as the cathode interface for hydrogen diffusion layer 232 and electrolyte. In this way, the cathode interface of the Proton Exchange Membrane Systems 23 conduces the hydrogen and the anode interface on the outside of the two proton exchange membranes 231 absorb oxygen in the atmosphere. The Proton Exchange Membrane Systems 23 causes water combination reaction between the hydrogen and oxygen, turning the chemical energy into electric energy and output from the output of the anode and the cathode interfaces, providing the motherboard 3 with D.C. power.

The Proton Exchange Membrane Systems 23 could be of the same size as the Thin Film Transistor so as to hide behind it and saves the space. Combined with the existing Thin Film Transistor, the large-sized Proton Exchange Membrane Systems 23 is able to exchange the oxygen from the atmosphere under normal pressure, thus enhances the efficiency of converting chemical energy to electricity energy of the fuel cell and provides great benefits for the industry.

Through the heat exchange of the CPU provided by the heat dissipation module 1 consisting of the heat dissipation base 11 and several hydrogen storage cans 12, the present invention not only saves the addition of a fan, but also minimizes the whole heat dissipation 1, allowing more flexibility to the assemblies, making them more suitable for the small space inside the notebook for heat dissipation. The direct and rapid heat absorption of the hydrogen storage cans 12 enhances the heat exchange efficiency of the CPU 4 and improves the heat dissipation of the high-level CPU used in current computers. The hydrogen release platen 21 and the flow rate control valve 22 of the electricity exchange module 2 controls the hydrogen released from the hydrogen storage cans 12 which is then transmitted to the Proton Exchange Membrane Systems 23 for the conversion from chemical energy to electricity energy and then output to the motherboard 3 of the computer as its D.C. power. The replaceable hydrogen storage cans 12 allow people to replenish the hydrogen when running out of hydrogen, eliminating the necessity of recharge, enabling it to replace the portable power of current notebooks, such as lithium cell or Nickel-Metal Hydride battery, providing extreme benefits for the industry.

What is claimed is:

1. A fuel cell with a heat exchange and an electricity exchange function for a computer comprising:
   a) a heat dissipation module connected to a mother board and a central processing unit of the computer and having:
      i) a heat dissipation base;
      ii) a plurality of sockets located in the base; and
      iii) a plurality of hydrogen storage cans, each of the plurality of hydrogen storage cans being inserted into one of the plurality of sockets; and
   b) an electricity exchange module having:
      i) a hydrogen release platen connected to and receiving hydrogen from each of the plurality of hydrogen storage cans;
      ii) a proton exchange membrane system electrically connect to the mother board and receiving the hydrogen from the hydrogen release platen; and
      iii) a flow rate valve located between the hydrogen release platen and the proton exchange membrane system and controlling a flow of the hydrogen,
   wherein the proton exchange membrane system includes two anode interfaces and a cathode interface located between each of the two anode interfaces, each of the two anode interfaces absorbing atmospheric oxygen, the cathode interface diffusing the hydrogen, and the proton exchange membrane system converting a chemical energy produced by the hydrogen and oxygen into an electrical energy to power the mother board.

2. The fuel cell according to claim 1, wherein the heat dissipation base includes a plurality of fins on an exterior thereof.

3. The fuel cell according to claim 1, wherein each of the plurality of hydrogen storage cans contains a solid hydrogen storage alloy on an interior thereof.

4. The fuel cell according to claim 1, wherein each of the plurality of hydrogen storage cans includes an inserting mouth and a contact valve located within the inserting mouth.

5. The fuel cell according to claim 1, wherein the hydrogen release platen includes a plurality of inserting troughs, each of the plurality of hydrogen storage cans is inserted into one of the plurality of inserting troughs.

6. The fuel cell according to claim 5, wherein each of the plurality of inserting troughs includes a protrusion engaging and opening a contact valve of each of the plurality of hydrogen storage cans.

7. The fuel cell according to claim 5, wherein each of the plurality of inserting troughs includes a leak resistant ring engaging the inserting mouth of each of the plurality of hydrogen storage cans.

8. The fuel cell according to claim 1, wherein the hydrogen release platen includes an air way connected to a conduit located between the hydrogen release platen and the proton exchange membrane system.

* * * * *